United States Patent
Blackport et al.

(10) Patent No.: US 11,741,262 B2
(45) Date of Patent: Aug. 29, 2023

(54) METHODS AND SYSTEMS FOR MONITORING A RISK OF RE-IDENTIFICATION IN A DE-IDENTIFIED DATABASE

(71) Applicant: Mirador Analytics Limited, Colchester (GB)

(72) Inventors: John Blackport, Redpath (GB); Colin Moffatt, Melrose (GB); Paul Symmers, Edinburgh (GB); Paul Bayless, Burke, VA (US); Jamie Gray, Melrose (GB)

(73) Assignee: Mirador Analytics Limited, Colchester (GB)

( * ) Notice: Subject to any disclaimer, the term of this patent is extended or adjusted under 35 U.S.C. 154(b) by 0 days.

(21) Appl. No.: 17/378,823

(22) Filed: Jul. 19, 2021

(65) Prior Publication Data

US 2022/0129584 A1    Apr. 28, 2022

Related U.S. Application Data

(60) Provisional application No. 63/104,783, filed on Oct. 23, 2020.

(51) Int. Cl.
*G06F 21/60* (2013.01)
*G06F 21/62* (2013.01)
(Continued)

(52) U.S. Cl.
CPC .......... *G06F 21/6254* (2013.01); *G06F 16/21* (2019.01); *G06F 21/577* (2013.01); *G06F 2221/034* (2013.01); *G06F 2221/2101* (2013.01)

(58) Field of Classification Search
None
See application file for complete search history.

(56) References Cited

U.S. PATENT DOCUMENTS 9,600,673 B2    3/2017    Chen et al.
10,242,213 B2   3/2019    Scaiano et al.
(Continued)

FOREIGN PATENT DOCUMENTS

| CA | 2679800 A1 * | 3/2010 | ....... G06F 17/30536 |
|----|----|----|----|
| CA | 2 986 320 A1 | 11/2017 | |
| WO | 2017-058876 A1 | 4/2017 | |

OTHER PUBLICATIONS

Ankar et al.; "Estimating the re-identification risk of clinical data sets", BMC Medical Informatics and Decision Making 2012, 15 pages, 12:66, http://www.biomedcentral.com/1472-6947/12/66.
(Continued)

*Primary Examiner* — Fatoumata Traore
(74) *Attorney, Agent, or Firm* — Ruggiero McAllister & McMahon LLC

(57) ABSTRACT

Methods and systems for monitoring a risk of re-identification for a dataset de-identified from a source database containing information identifiable to individuals are described. A first aspect of the disclosure relates to a method comprising: providing a graphical user interface (GUI) configured to receive as input the dataset and updates to said dataset; providing as input to the GUI the dataset; estimating a risk of re-identification for the dataset or a subset of the database; providing as input to the GUI the updates to said dataset; regularly monitoring whether the risk of re-identification for at least one of the updated dataset, the subset of the database and the updates is below a predetermined dataset risk threshold; and if the risk of re-identification has reached or exceeded the predetermined dataset risk threshold, notifying the user.

16 Claims, 10 Drawing Sheets

(51) Int. Cl.
*G06F 16/21* (2019.01)
*G06F 21/57* (2013.01)

(56) References Cited

U.S. PATENT DOCUMENTS

| | | |
|---|---|---|
| 10,423,803 B2 | 9/2019 | Scaiano et al. |
| 10,803,201 B1* | 10/2020 | Nicholls ............. G06F 21/6254 |
| 2004/0049517 A1 | 3/2004 | Singh |
| 2004/0199781 A1* | 10/2004 | Erickson ................ G16Z 99/00 |
| | | 726/26 |
| 2005/0165623 A1* | 7/2005 | Landi .................... G16H 10/60 |
| | | 705/2 |
| 2010/0077006 A1 | 3/2010 | El Emam et al. |
| 2013/0332194 A1* | 12/2013 | D'Auria ................ G16H 10/60 |
| | | 705/3 |
| 2016/0154978 A1 | 6/2016 | Baker et al. |
| 2016/0155061 A1 | 6/2016 | Korte et al. |
| 2016/0371508 A1* | 12/2016 | McCorkendale ....... H04L 63/20 |
| 2017/0083719 A1* | 3/2017 | Scaiano ................ G06F 16/903 |
| 2017/0091279 A1 | 3/2017 | Shah et al. |
| 2017/0124351 A1* | 5/2017 | Scaiano ............. G06F 21/6254 |
| 2017/0177907 A1* | 6/2017 | Scaiano ............. G06F 21/6254 |
| 2019/0065775 A1 | 2/2019 | Klucar, Jr. et al. |
| 2019/0138749 A1* | 5/2019 | Kim .................... G06F 21/6254 |
| 2019/0188292 A1* | 6/2019 | Gkoulalas-Divanis ...................... |
| | | G06F 17/18 |
| 2019/0272386 A1* | 9/2019 | Ley ..................... G06F 21/6245 |
| 2020/0117826 A1 | 4/2020 | Lilly, Jr. et al. |
| 2020/0311308 A1* | 10/2020 | Arbuckle ............... G06N 20/00 |
| 2020/0320224 A1 | 10/2020 | Regensburger et al. |
| 2020/0380159 A1 | 12/2020 | Lilly et al. |
| 2021/0264057 A1 | 8/2021 | Murray et al. |
| 2021/0365580 A1 | 11/2021 | Klucar, Jr. et al. |
| 2021/0397733 A1 | 12/2021 | Lilly et al. |

OTHER PUBLICATIONS

Malin et al.; "Never too old for anonymity: a statistical standard for demographic data sharing via the HIPAA Privacy Rule", J Am Med Inform Assoc 2011; 8 pages, 18:3-10. Doi:10.1136/jamie.2010.004622.

* cited by examiner

Summary
Dataset is not de-identified. A modified dataset that is de-identified has been made available at: [link address]

Dataset fields
Following previous expert determination of a comparable dataset by the risk determination expert, a dataset with the following dataset fields was assessed.
- Table name: Patient
- Number of columns: 5
- Number of rows: 20

Quasi-identifiers
The following quasi-identifiers were present in the dataset:
- PatientAge
- PatientGender
- PatientZip

Indirect identifiers inferable from medical information
ICD10 codes were present in the 'ICD10' variable. This is commonly regarded as contributing to re-identification risk. In this case, the dataset was found to contain the following codes that contribute to risk: E54.X. These codes must be removed before the dataset can be considered as de-identified.

Quantitative assessment
The above listed quasi-identifiers were assessed using comparison to known populations. The results are shown below. As more than 1% of individuals in the dataset exist in groups of less than five in the population, the dataset is not de-identified.
- Percentage of identifiable individuals: 10.0
- Percentage of non-identifiable individuals: 90.0

FIG. 10

METHODS AND SYSTEMS FOR MONITORING A RISK OF RE-IDENTIFICATION IN A DE-IDENTIFIED DATABASE

CROSS REFERENCE TO RELATED APPLICATION

This application claims the benefit of U.S. Provisional Application No. 63/104,783, filed on Oct. 23, 2020. The entire teachings of the above applications are incorporated herein by reference.

TECHNICAL FIELD

The present disclosure relates methods and systems for monitoring a risk of re-identification in a de-identified database.

BACKGROUND

A database, or dataset, is an organized collection of data, generally stored and accessed electronically from a computer system. Databases are often organized in tables where each row represents a database record and each column represents a database field. A record may correspond for example to an individual and a field may correspond for example to an attribute of a person, such as the person's name, age, nationality and so on.

With the advancement of big data analytics and data science, the number of data marketplaces and organizations selling or sharing databases has multiplied. Parallelly, the privacy of individuals whose information is contained in those databases has become an increasing concern. Various provisions, both national and international, have been introduced to ensure that organizations working with databases which contain personal data protect the privacy of individuals through sufficient levels of data de-identification.

Organizations are generally required to de-identify databases before sharing them with third parties and/or the public. De-identification is the process of removing or obscuring fields that allow an individual to be identified. Typically, a dataset is de-identified by removing fields which comprise explicit personal information such as personal names or social security numbers. These are generally called "identifiers" or "direct identifiers". However, a database may also comprise fields, referred to as "quasi-identifiers", which are not direct identifiers but which in combination with other quasi-identifiers from the same or from other databases may lead to the identification of an individual. Examples of quasi-identifiers may be for example full zip codes, date of birth or death and so on. An attacker may manage to re-identify one or more records in a database where no direct identifiers are present by consulting public sources such as civil registries or Census databases and linking quasi-identifiers in the database to direct identifiers available in the public source.

The risk of re-identification of a dataset, i.e. the risk that one or more records in the dataset may be re-identified and associated to a specific individual, is a big concern particularly for databases which contain healthcare data, such as databases managed by hospital systems, provider groups, insurance companies, analytics companies, and so on. Some regulations set a minimum standard for de-identification which such database owners must meet in order to ensure the risk of re-identification is kept at a minimum. In the US for example, the sharing of electronic medical records (EMR) is subject to the de-identification standard set forth by the Health Insurance Portability and Accountability Act (HIPAA) Privacy Rule. Despite the HIPAA Privacy Rule delineating several routes by which data can be rendered de-identified, most organizations rely on the "Safe Harbor" approach, which enumerates 18 identifiers that must be suppressed. However, this approach is often criticized as being too stringent because it may suppress attributes which are essential for epidemiological and population-based studies, thereby limiting the usefulness of the databases for research purposes.

A dataset, such as the electronic medical records of a clinical trial, may be updating constantly, due to the removal, amending or addition of data. Therefore, it is likely that a user may need to re-check that the risk of re-identification is still compliant with the provisions quite frequently. This is problematic from a privacy perspective, since it relies on database owners repeatedly needing the service of a risk determination expert or relying on their own assessment to determine when the risk of a database needs to be re-assessed which may result in an increased violation of the regulations in place. Even when a risk determination expert is regularly consulted, customer's data will often drift toward higher risk levels between evaluations thereby bringing the database compliance into question.

For large datasets, even one assessment of risk is often quite expensive from a time, computational and economical point of view. Current methods to estimate a risk of re-identification are quite cumbersome and often involve a risk determination expert assessing each database individually with fairly limited automation. The risk determination expert may be required to go through various meetings and conversations with their customers, the database owners, before the assessment is possible. The process may be further slowed down by customers and expert often being in different time zones, customers providing inaccurate data and accompanying information, and so on.

In conclusion, assessing the risk of re-identification can often turn out to be a time-consuming process which slows down the workflows of owners, researchers who need the database for their studies, and users in general; and the issues are even more problematic when multiple determinations are required over a short period of time. It would also be desirable to have system and methods for automatically alerting the user when a new risk assessment is required; and it would be desirable to have systems and methods for assessing the risk of re-identification in a faster and fully or semi-automated way such that the time, costs and number of interactions between database owners/users and experts are minimized.

The optimal de-identification strategy and the model used to estimate a risk of re-identification for a database may depend on the specific application. Different users may tolerate different levels of risk or they may prioritize certain attributes to be maintained in the database over others. In certain circumstances, a user may prefer to remove specific records which have a particularly high risk of being re-identified, rather than perturbing or removing a field for the entire database. Or, a user may prefer to sacrifice certain attributes or fields and remove them from the database altogether rather than stripping some records off the database. It would be desirable to have methods and systems which allow the users and the risk determination experts to take into account user needs and easily adapt the de-identification strategy and the risk model to each specific application.

The risk of re-identification has traditionally been assessed by risk determination experts by measuring the level of violation of k-anonymity, i.e. by assessing how many records in the dataset have a k-value above a predetermined threshold. A dataset is said to have k-anonymity if the information for each record in the dataset cannot be distinguish from at least k−1 other records in the dataset. Violation from k-anonymity is calculated as the percentage of records that have a k-value less than some threshold, e.g. 5. Generally, the accepted criteria for considering a dataset de-identified is having less than 1% of the records with k-value below 5. However, this approach presents some disadvantages. Firstly, it is based on a relative calculation in which the risk of each record is computed relative to other records in the dataset, and therefore it can only be applied to a dataset and not to individual records. Secondly, the k-anonymity approach implies that the risk of each record is affected by the size of the dataset. Thirdly, if some of the records are missing certain information, this affects calculation of the risk of the records which falls in the same k-anonymity group. Lastly, it does not allow for an easy understanding of how each variable contributes to the risk. Using k-anonymity to estimate re-identification risk can also result in an overestimation of the risk and in turn in unnecessary suppression of information contained in the database, thereby degrading the quality and utility of the dataset. High levels of privacy for individuals should be guaranteed in all databases comprising sensitive healthcare data while maximizing data utility to allow for innovation, efficiency, and development in healthcare. Therefore, de-identification criteria should be construed on the principle that the risk of re-identification should be kept small enough in order to ensure the privacy of individuals is protected whilst not removing useful data unnecessarily. It would be desirable to provide a method for estimating a risk of re-identification of a database which is not overly stringent and which takes into account the absolute risk of re-identification of a record.

Lastly, database owners may need to document statistical analysis and rationale for any residual disclosure risk to prove p compliance to multiple regulatory bodies, for example if similar data is used in different countries or made available to different types of recipients or for different applications. Definitions of deidentification and anonymization may differ for different industries, countries, or regions meaning a company must perform determinations to align with the differing definitions. Database owners need to perform an expert determination each time there are changes in the data or the surrounding environment. These determinations can take time, and the multiple iterations can further contribute to times and delays. Between assessments, a database which is being regularly updated may have reached an unacceptable level of risk.

SUMMARY

It is an object of the disclosure to address one or more of the above-mentioned limitations.

According to a first aspect of the disclosure there is provided: a method for monitoring a risk of re-identification for a dataset de-identified from a source database containing information identifiable to individuals, the method comprising: providing a user interface (UI) configured to receive as input the datasets and updates to said dataset; providing as input to the UI the dataset; estimating a risk of re-identification for the dataset or a subset of the database; providing as input to the UI the updates to said dataset; regularly monitoring whether the risk of re-identification for at least one of the updated dataset, the subset of the database and the updates is below a predetermined dataset risk threshold; and if the risk of re-identification has reached or exceeded the predetermined dataset risk threshold, notifying the user.

Optionally, the database comprises a plurality of database records and a plurality of database fields, wherein each database record has a plurality of associated field values, each associated field value being related to a database field.

Optionally, the dataset comprises a plurality of dataset records and a plurality of dataset fields, wherein each dataset record has a plurality of associated field values, each associated field value being related to a dataset field.

Optionally, the plurality of dataset records is a subset of the database records and the plurality of dataset fields is a subset of the database fields.

Optionally, each database record corresponds to an individual of a source population.

Optionally, the database fields comprise one or more medical data fields.

Optionally, the updates to the dataset comprise one or more of: removing one or more records from the dataset records; adding one or more records to the dataset records; and removing, adding or modifying one or more dataset fields.

Optionally, one or more fields correspond to a categorical or numerical variable and modifying such fields comprises reducing the granularity of the field values relating to said fields.

The method may comprise providing in input one or more different risk estimation models and the risk of re-identification for a dataset is estimated according to one or more different risk estimation models.

Optionally, estimating a risk of re-identification comprises estimating an individual risk of re-identification for each record; and determining how many records have an individual risk of re-identification above a pre-specified individual risk threshold.

Optionally, estimating the individual risk or re-identification for each record comprises: selecting a subset of fields; and for each field in the subset, computing a population field statistical distribution.

Optionally, estimating the individual risk or re-identification for each record further comprises: computing a combined statistical distribution of the subset of fields from the population field statistical distributions; and from said combined statistical distribution, computing the likely number of members of the source population that have the same field value as the record for each field in the subset of fields.

Optionally, the fields in the subset of fields are selected such that all fields in the subset of fields are quasi-identifiers.

Optionally, computing the population field statistical distribution comprises selecting the source database or a second database external to the source database which relates to the source population; and deriving the population field statistical distribution from the selected database.

Optionally, estimating the risk of re-identification comprises computing a mean and standard deviation of the individual risk of re-identification for all dataset records.

Optionally, the method comprises computing an internal statistical distribution of the dataset; and regularly monitoring whether the risk of re-identification for at least one of the updated dataset or the updates is below the predetermined dataset risk threshold comprises: regularly monitoring the internal statistical distribution of the dataset; and if the internal statistical distribution varies beyond a predetermined accepted variation, re-computing the risk of re-identification for the dataset.

Optionally, providing updates to the initial dataset comprises providing a set of de-identified records to be added to the dataset.

Optionally, regularly monitoring whether the risk of re-identification for at least one of the updated dataset or the updates is below a predetermined dataset risk threshold comprises computing the risk of re-identification for the set of database records; and if the risk of re-identification for the set of database records is greater than the risk of re-identification for the dataset, re-computing the risk of re-identification for the updated dataset.

Optionally, regularly monitoring whether the risk of re-identification for at least one of the updated dataset or the updates is below a predetermined dataset risk threshold comprises: each time a set of database records is added to the dataset, computing an internal statistical distribution of the set of database records; and if the internal statistical distribution of the set of database records differs from the internal statistical distribution of the dataset beyond the predetermined accepted variation, re-computing the risk of re-identification for the updated dataset.

Optionally, the method further comprises providing as output a metric representing the absolute or proportional number of identifiable and non-identifiable records in the dataset.

Optionally, the method further comprises providing as output a metric representing the absolute or proportional number of higher risk and lower risk records in the dataset.

Optionally, estimating the risk of re-identification comprises: for each source database, providing a list of risk-determination rules; and automatically computing the risk of—reidentification of the database based on the list of risk-determination rules.

Optionally, the method further comprises: if the risk of re-identification has reached or exceeded the predetermined dataset risk threshold, identifying the dataset as non-compliant; iteratively modifying the non-compliant dataset until the risk of re-identification for the modified dataset is below the predetermined dataset risk threshold in order to generate a compliant dataset; and providing the compliant dataset in the user interface.

Optionally, the method further comprises providing as input to the user interface a set of modification rules based on the source database.

Optionally, the non-compliant dataset is modified according to the modification rules.

Optionally, the method comprises providing in input one or more user field priority settings and/or other user priority settings and the modification rules take into account said settings.

Optionally, modifying the non-compliant dataset comprises removing one or more records for which the individual risk of re-identification is above the pre-determined individual risk threshold.

Optionally, generating a compliant dataset comprises identifying fields in the dataset which are contributing to the risk of re-identification and removing or modifying one or more of said fields.

Optionally, regularly monitoring whether the risk of re-identification for at least one of the updated dataset or the updates is below a predetermined threshold comprises estimating the risk of re-identification for the updated dataset at scheduled intervals.

Optionally, the intervals are predetermined time intervals.

Optionally, the intervals are a predetermined number of updates intervals.

Optionally, the predetermined dataset risk threshold comprises a range set by a user, an assessor or a regulatory body.

Optionally, the method comprises: if the risk of re-identification is close to reaching or exceeding the predetermined dataset risk threshold, providing an alert in the user interface.

Optionally, the method comprises: if the risk of re-identification is close to reaching or exceeding the predetermined dataset risk threshold, providing an alert by email and/or text.

Optionally, the method further comprises providing in the GUI an automatically generated outcome report of the monitoring of the risk of re-identification.

Optionally, the user interface comprises a graphical user interface (GUI).

Optionally, the method further comprises providing a graphical representation of the fluctuations of the risk of re-identification over time.

Optionally, the method further comprises providing in the GUI a certificate of compliance with the predetermined dataset risk threshold.

According to a second aspect of the disclosure there is provided: a system for monitoring a risk of re-identification for a dataset de-identified from a source database containing information identifiable to individuals, the system comprising:
- a user interface (UI) configured to receive as input the dataset and updates to said dataset;
- a memory configured to store the dataset;
- a risk estimation module configured to estimate a risk of re-identification for the dataset or a subset of the database; and
- a risk monitoring module configured to regularly monitor whether the risk of re-identification for at least one of the updated datasets or the subset of the database updates is below a predetermined dataset risk threshold;

wherein the system is configured to:
if the risk of re-identification has reached or exceeded the predetermined dataset risk threshold, notify the user.

Optionally the user interface comprises a graphical user interface (GUI).

Optionally, the graphical user interface comprises one or more of a dataset owner view, an expert view and a reviewer view.

Optionally, the database comprises a plurality of database records and a plurality of database fields, wherein each database record has a plurality of associated field values, each associated field value being related to a database field.

Optionally, the dataset comprises a plurality of dataset records and a plurality of dataset fields, wherein each dataset record has a plurality of associated field values, each associated field value being related to a dataset field.

Optionally, the plurality of dataset records is a subset of the database records and the plurality of dataset fields is a subset of the database fields.

Optionally, the graphical user interface comprises graphical elements to input one or more user field priority settings and/or other user priority settings.

Optionally, the updates to the database comprise one or more of: removing one or more records from the dataset records; adding one or more records to the dataset records; and removing, adding or modifying one or more dataset fields.

Optionally, the graphical user interface comprises graphical elements to allow the user to modify one or more dataset fields; and the graphical user interface is configured to show the evolution of the risk of re-identification for the dataset in real-time.

According to a third aspect of the disclosure there is provided a method for determining whether a dataset de-identified from a source database containing information identifiable to individuals is compliant with one or more given regulations, the method comprising:
providing a list of risk-determination and compliance rules;
using a computer device, automatically computing the risk of—reidentification of the dataset based on one or more of said rules; and
using a computer device, automatically determining whether the dataset is compliant with the one or more regulations based on one or more of said rules.

Optionally, the rules in the list of risk-determination and compliance rules are dependent on the one or more provided regulations.

Optionally, the method further comprises: if the dataset is determined to be compliant with one or more of the provided regulations, automatically generating a certificate of compliance for said one or more regulations.

Optionally, the method further comprises, if the dataset is determined to be non-compliant with one or more of the provided regulations, implementing one or more of the following steps:
automatically determining a list of causes of non-compliance; and
automatically determining a list of corrective steps to modify the dataset and make it compliant;
automatically modifying the non-compliant dataset to provide a compliant dataset.

According to a fourth aspect of the present disclosure there is provided a system for determining whether a dataset de-identified from a source database containing information identifiable to individuals is compliant with one or more given regulations, the system comprising:
a user interface (UI) configured to receive as input the dataset and a list of risk-determination and compliance rules;
a memory configured to store the list of risk-determination and compliance rules;
a risk estimation and compliance determination module configured to automatically compute the risk of—reidentification of the dataset based on one or more of said rules; and automatically determine whether the dataset is compliant with the one or more regulations based on one or more of said rules.

Optionally, the risk estimation and compliance determination module is further configured to, if the dataset is determined to be compliant with one or more of the provided regulations, automatically generate a certificate of compliance for said one or more regulations.

Optionally, the risk estimation and compliance determination module is further configured to, if the dataset is determined to be non-compliant with one or more of the provided regulations, provide in output one or more of:
a list of causes of non-compliance;
a list of corrective steps to modify the dataset and make it compliant;
a compliant dataset.

The systems and method of the second, third and fourth aspect may also incorporate using or providing features of the first aspect and various other steps as disclosed herein.

BRIEF DESCRIPTION OF THE DRAWINGS

The disclosure is described in further detail below by way of example and with reference to the accompanying drawings, in which:
FIG. 10 is an example of report automatically generated by the system of FIG. 3.

DESCRIPTION

Figure 1:
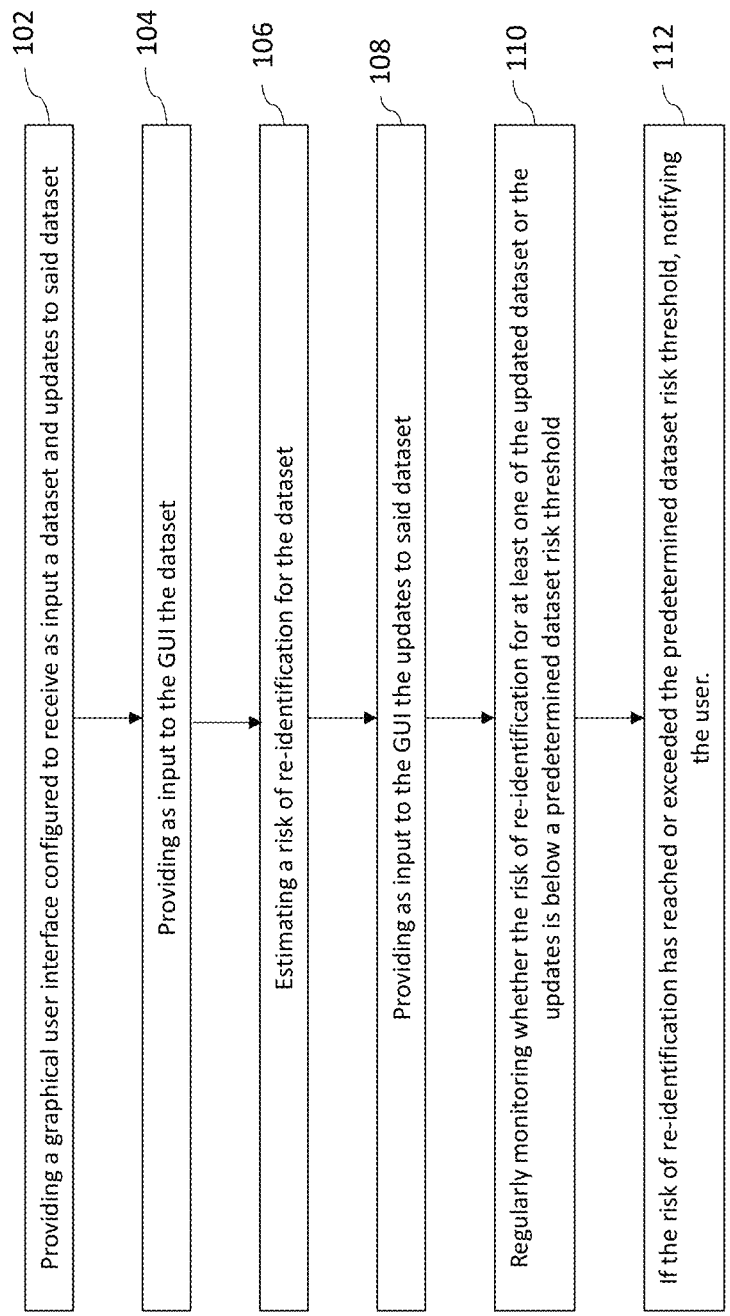
FIG. 1 is a schematic diagram of a method for monitoring a risk of re-identification for a dataset de-identified from a source database containing information identifiable to individuals according to a first aspect of the present disclosure.

FIG. 1 is a schematic diagram of a method 100 for monitoring a risk of re-identification for a dataset de-identified from a source database containing information identifiable to individuals according to a first aspect of the present disclosure. The method 100 comprises: at step 102, providing a user interface (UI) configured to receive as input the dataset and updates to said dataset; at step 104, providing as input to the UI the dataset; at step 106, estimating a risk of re-identification for the dataset; at step 108, providing as input to the UI the updates to said dataset; at step 110, regularly monitoring whether the risk of re-identification for at least one of the updated dataset or the updates is below a predetermined dataset risk threshold; and at step 112, if the risk of re-identification has reached or exceeded the predetermined dataset risk threshold, notifying the user.

Figure 2:
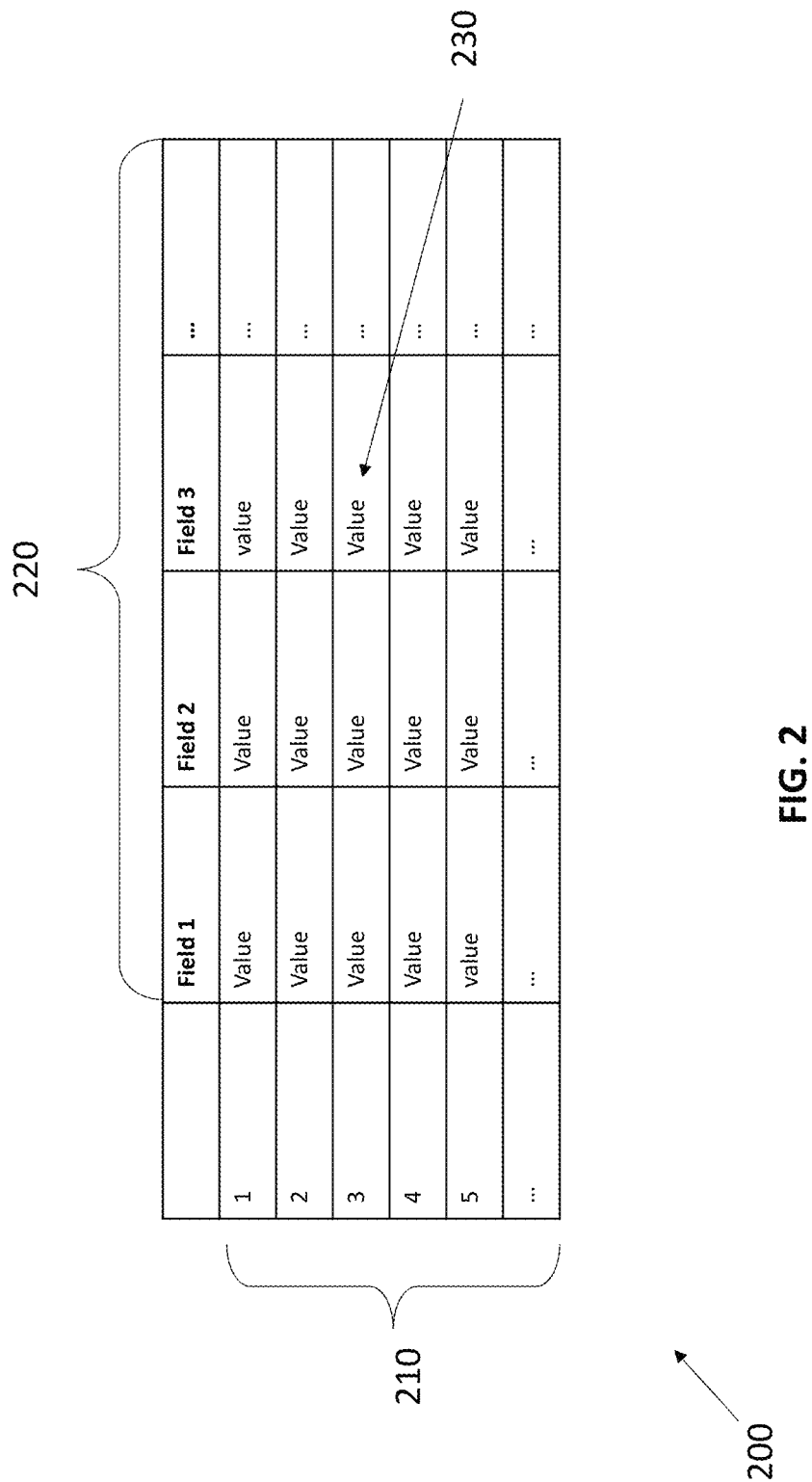
FIG. 2 illustrates an example database.

An example source database is shown in FIG. 2. The database 200 comprises a plurality of database records 210 and a plurality of database fields 220. Each record 210 has a plurality of associated field values 230, with each field value corresponding to a database field. For example, each database record 210 may correspond to an individual of a source population and the fields 220 may correspond to attributes of said individuals, such as "name", "age", "sex" and so on. The fields 230 may comprise both direct identifiers and quasi-identifiers. The source population may be for example the whole world population, or the population of a specific country, or a specific age group within the country population, and so on. The associated field values 230 may comprise numerical and categorical variables. For example, the associated field values corresponding to the field "age" are typically positive numbers, whereas the associated field values corresponding to the field blood type are typically one of the 4 categories A, B, AB and 0.

In some embodiments of the systems and methods according to the present disclosure, the fields 220 comprise one or more medical data fields, such as fields corresponding to blood analysis results, diagnosis, prognosis and so on.

It will be appreciated that the database 200 does not necessarily correspond to a database as intended in the common sense, i.e. to a single collection of data. The database 200 may comprise a plurality of databases and such databases may be stored in different places. Database 200 herein simply indicates the totality of non-de-identified data from which a de-identified dataset can be sourced, independently on whether the user has actually performed the act of gathering such data in a single place/device/table prior to de-identifying said data.

For example, a user may need to create a de-identified dataset from data collected by a research trial which is taking place across different hospitals, wherein each hospital has a local electronic medical record system where the data related to the recruited patients are stored. In this example scenario, the user may source data from each hospital's EMR in order to create a de-identified dataset for analyzing the results of the clinical trial. The data may be de-identified locally at each hospital and subsequently provided to the user who merges them into one single dataset; or the user may receive the data and de-identify them individually prior to merging them into a single dataset; or the data may be provided to the user prior to being de-identified the user merges them into one single dataset and then de-identifies them.

In preferred embodiments, the user interface comprises a graphical user interface (GUI), although it will be appreciated that other types of user interfaces, such as a command prompt, may be used without departing from the scope of the present disclosure.

Figure 3:
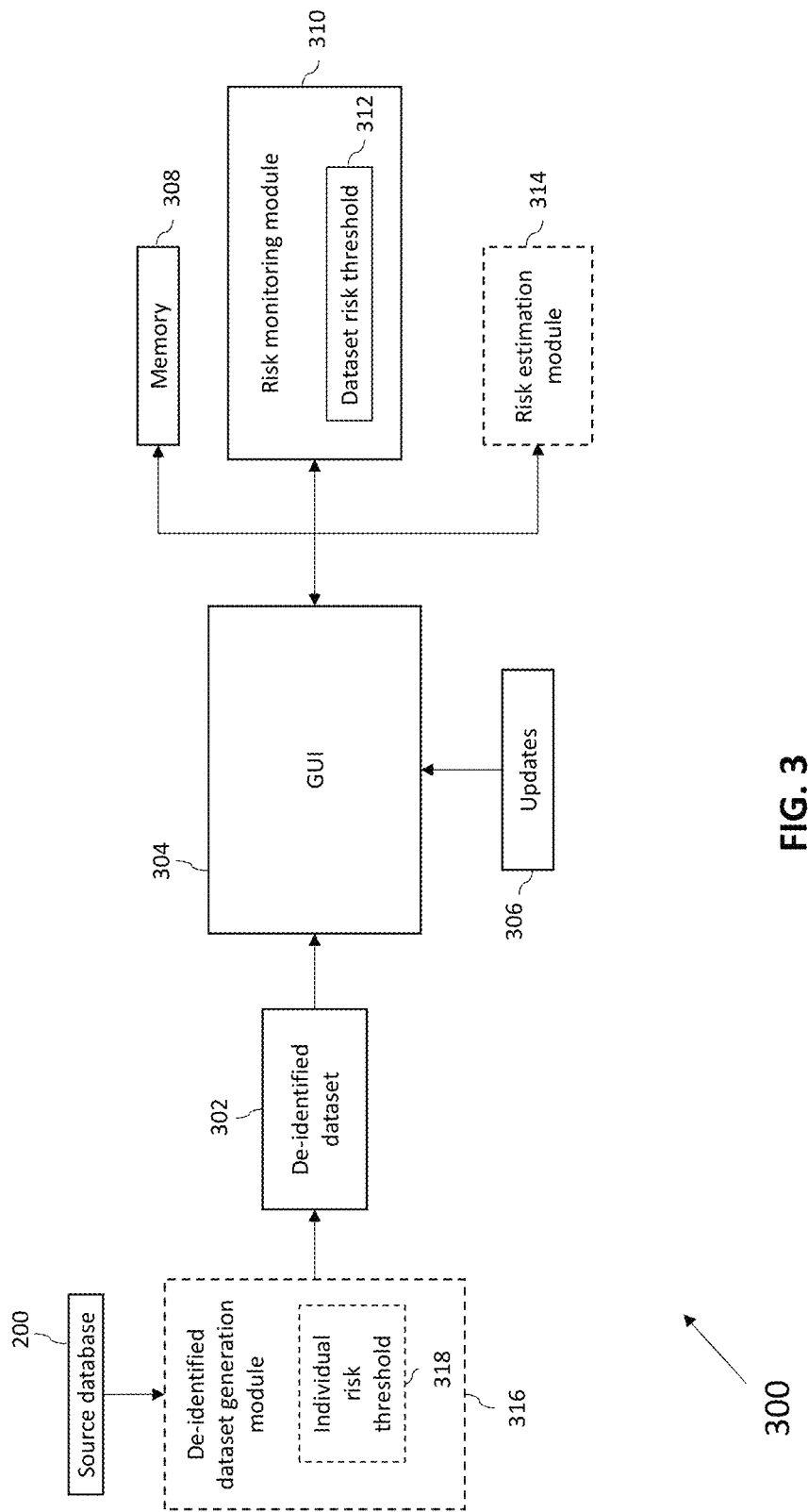
FIG. 3 is a schematic diagram of a system 300 for monitoring a risk of re-identification for a dataset de-identified from a source database containing information identifiable to individuals and according to a second aspect of the present disclosure.

FIG. 3 is a schematic diagram of a system 300 for monitoring a risk of re-identification for a dataset 302 de-identified from a source database containing information identifiable to individuals and according to a second aspect of the present disclosure. The system 300 may be used in combination with the method of FIG. 1. The system 300 comprises a user interface in the form of a graphical user interface 304 configured to receive as input the dataset 302 and updates 306 to said dataset.

The dataset 302 may be de-identified for example from the source database 200 and may comprise a plurality of dataset records and a plurality of dataset fields, wherein each record has a plurality of associated to field values. The plurality of dataset fields may be a subset of the database fields; that is, the dataset may comprise only a subset of the fields in the database 200. Typically, the de-identified dataset 302 will not comprise any field which is a direct identifier.

The system 300 comprises a memory 308 configured to store the de-identified dataset 302; and a risk monitoring module 310 configured to estimate a risk of re-identification for the dataset 302 and to regularly monitor whether the risk of re-identification for at least one of the updated dataset or the updates is below a predetermined dataset risk threshold 312. The system 300 is configured to notify the user via the graphical user interface if the risk of re-identification reaches or exceeded the predetermined dataset risk threshold 312. The system 300 may further comprise a risk estimation module 314 for estimating the risk of re-identification of the dataset stored in the memory.

In some embodiments the dataset 302 is already de-identified when provided as input to the system 300. In other embodiments the system 300 comprises a de-identified dataset generation module 316 which receives in input the database 200 and provides as output the de-identified dataset 302. The de-identified dataset generation module 316 may be configured to identify a subset of the database fields 320 which are direct identifiers and remove all corresponding field values 330 from the dataset 302.

It will be appreciated that the de-identified dataset 302 may comprise all the records of the database 200 or the dataset records may be just a subset of the database records. For example, the database 204 may correspond to a big data warehouse from which the user of the system 300 can extract multiple de-identified dataset 302 to sell to or share with multiple parties and/or to use in multiple projects or research studies. Or the database 200 may represent a database built specifically for one party/application but from which some records are omitted due to de-identification needs. For example, the de-identified dataset generation module 316 may be configured to assess a risk of re-identification of each record as part of the generation of the dataset and to omit all records which have a risk of re-identification which is above a pre-determined individual risk threshold 318. Or the de-identified dataset generation module 316 may be configured to discard database records which have missing values. In some embodiments the de-identified dataset generation module 316 comprises a parsing module which assesses for each record whether the field value associated to the record is of a correct type and the generation module discards all database records for which one or more of the associated values cannot be correctly parsed or are not of a correct type. In some embodiments, the dataset generation module 316 may allow for some of these inaccurate records which have values with incomplete fields, i.e. with some missing or incorrect associated field values, to be included in the de-identified dataset 302 up to a maximum number of inaccurate records which is set by a user of the dataset, or a risk determination expert, or a database owner and so no. One or more rules for de-identifying the records of the database 200 may be set by a risk determination expert via the GUI 304 and stored in the memory 308.

A user may need to extract a de-identified dataset 302 with a specific number of records from the database 200 and the dataset generation module 316 may be configured to randomly select said number of records among the database records 210 and to de-identify them in order to generate the de-identified dataset 302.

The system 300 may be configured to implement various project management functionalities. In particular, the GUI 304 may be configured to allow a database owner to create an organization account and various organization user accounts, each organization user account having access to specific functionalities of the system 300 according to the type of user. Types of user may be for example director, data manager, data scientist and so on.

In some embodiments, the method 100 further comprises, once the risk of re-identification for a given dataset has been assessed, determining whether the dataset is compliant/non-compliant with one or more privacy regulations selected by a user; and, if a dataset is found to be non-compliant, determining the cause of non-compliance and possible corrective steps to adjust the dataset and make it complaint with the selected regulation(s). Determining whether a dataset is compliant or non-compliant with a specific regulation may comprise comparing the risk of re-identification with the predetermined threshold and/or further steps. One or more rules for determining whether a dataset is compliant or non-compliant with a specific regulation may be provided in input to the GUI 304 by a risk determination expert and stored in the memory 308. The system 300 may comprise a risk estimation and compliance determination module configured to automatically compute the risk of—reidentification of the dataset based on one or more of said rules; and automatically determine whether the dataset is compliant with the one or more regulations based on one or more of said rules.

The GUI 304 may comprise a database owner view, a risk determination expert view and an assessor view. For example, the system 300 may be implemented as an online platform wherein database owners, risk determination experts and assessors can all access the information related to a specific database at any time. The owner can create a project and upload multiple de-identified datasets related to said projects via the owner view. The system 300 may be configured to, whenever the risk of re-identification for a given dataset is estimated, provide in output an automatically generated outcome report of the monitoring of the risk of re-identification and, if the risk is below the predetermined dataset risk threshold, provide in output a certificate of compliance. For example, the risk estimation and compliance determination module may be configured to automatically generate the certificate of compliance and the report. An example of automatically generated report is shown in FIG. 10. The report and certificate may then be stored in the memory such that any user, database owner, assessor or risk determination expert, can retrieve it at any later time to ascertain compliant of the dataset. The automatically generated report may comprise information related to the compliance status of the dataset, causes of non-compliance and/or corrective steps to make the dataset compliant. The risk estimation and compliance determination module may further be configured to provide in output a compliant dataset.

The method 100 may further comprise providing a graphical representation of the fluctuations of the risk of re-identification over time, such as by displaying a graph of the risk of re-identification vs time in the GUI 304.

The workings of the system 300 will now be illustrated in further detail with reference to FIG. 4, which is a schematic diagram illustrating an example use case of the system 300, in accordance with a first embodiment of the method 100.

At step 402 a user provides as input to the GUI 304 the de-identified dataset 302. At step 404, the risk of re-identification of the de-identified dataset 302 is estimated. The risk of re-identification may be estimated "manually" by a risk determination expert who has access to the GUI 304 and inputs the result of the risk estimation; or in some embodiments the risk may be automatically estimated by the risk estimation module 314. Various risk estimation models may be used as explained in more details below. If the risk of re-identification is below the pre-determined dataset risk threshold 312, the dataset is deemed to be compliant. The pre-determined dataset risk threshold 312 may comprise a threshold set by a user, an assessor or a regulatory body. Typically, the pre-determined dataset risk threshold will be a threshold agreed between a risk determination expert and a database owner based on the type and purpose of the dataset 302.

Subsequently the user provides as input to the GUI 304 one or more updates 306 to the de-identified dataset 302. The updates 306 may comprise adding or removing dataset records, adding or removing dataset fields, as well as modifying one or more dataset fields. In particular, a dataset field may correspond to a categorical variable, such as a blood type or a zip code, or to a numerical variable, such as an age or glucose level; and modifying such fields may comprise reducing the granularity of the field values related to those fields. For example, values in the age field may be grouped in 5-year intervals; or zip codes may be shown only up to the first 3 digits; and so on.

Each time a new update is provided, the dataset stored in the memory 308 is updated with the updates (step 408). At step 410, the monitoring module 304 monitors whether the risk of re-identification for the updated dataset is below the dataset risk threshold 312. If it is, the updated dataset is labelled as compliant (step 412), otherwise the GUI 304 notifies the user that the dataset is not compliant anymore (step 414).

Figure 5:
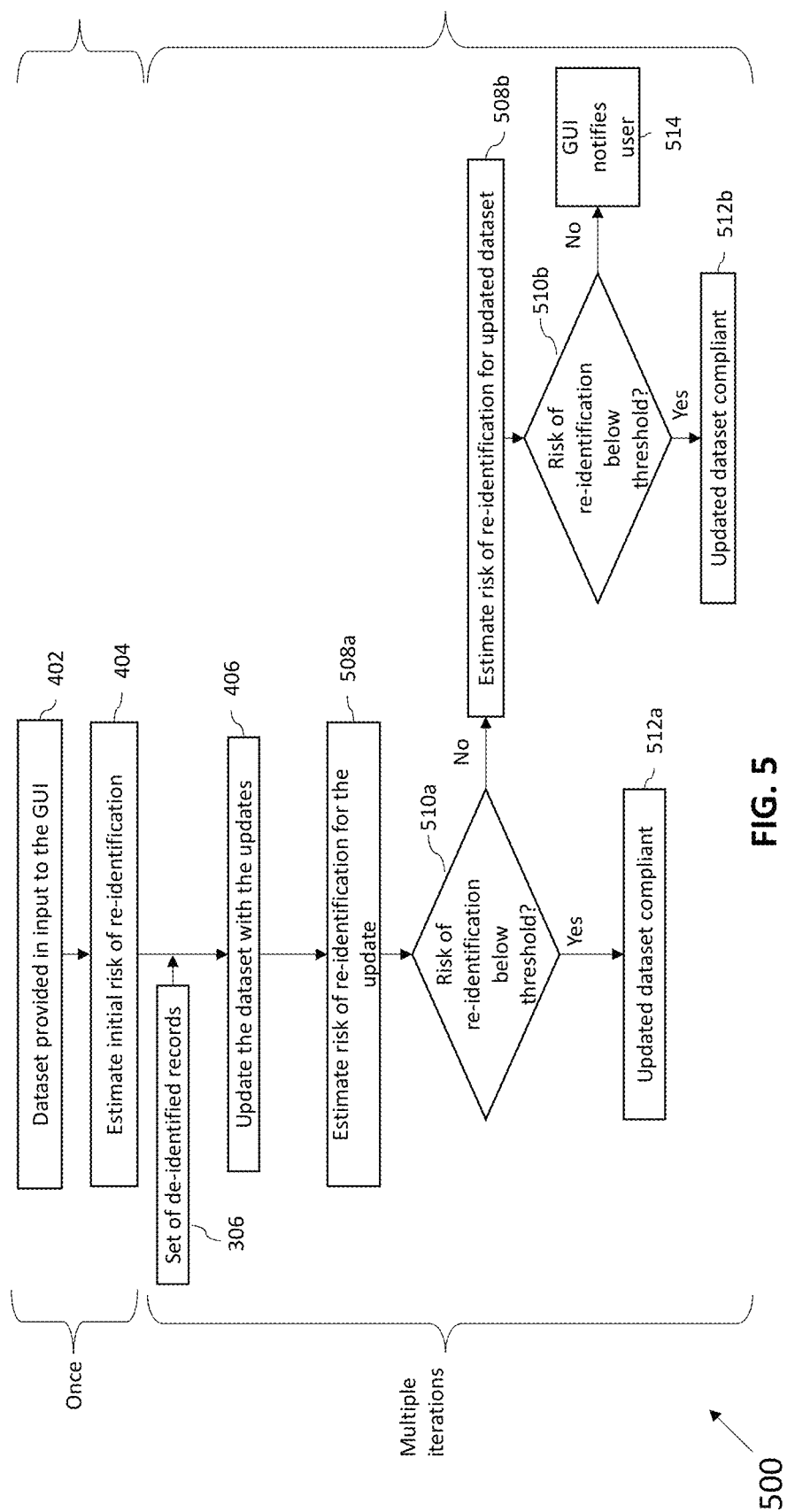
FIG. 5 is a schematic diagram illustrating an example use case of the system of FIG. 3, in accordance with a second embodiment of the method of FIG. 1.

In some embodiments the risk of re-identification is monitored by looking at the risk of the re-identification for the updates rather than for the updated dataset. For example, the updates may comprise providing a set of database records to be added to the dataset. This is shown in FIG. 5, which is a schematic diagram illustrating an example use case of the system 300, in accordance with a second embodiment of the method 100. Common reference numerals and variables between figures represent common features.

In the present example, the update 306 comprises providing a set of de-identified records to be added to the dataset 302. At step 406, the updates are applied to the dataset 302 stored in the memory 304. At step 508a, the risk of re-identification for the set of database records provided in the update 306 is estimated. If the risk of re-identification is below the pre-determined threshold 312 (step 510a), then the updated dataset is deemed compliant (step 512a). If the risk of re-identification for the update 306 is not below the pre-determined dataset risk threshold 312, then the risk of re-identification for the updated dataset is estimated (508b). If the risk for the updated dataset is below the pre-determined threshold then the updated dataset is deemed compliant, otherwise the GUI may provide a notification to the user. This is to account for the fact that a set of records provided in the update 306 may have a high risk of re-identification on its own, but once ingested into the dataset 302, the risk of re-identification of the overall dataset may still be within the accepted range.

It will be appreciated that many variations to the above methods are possible. For example, the system may be configured to abort the monitoring process as soon as it is determined that the risk of the update is above the threshold instead of looking at the risk of the updated dataset. The GUI may be configured to provide a notification to the user whenever the risk of re-identification for the update is above the threshold, even though the risk of re-identification for the overall updated dataset is still below the threshold, and so on. It will also be appreciated that the steps illustrated in FIGS. 4 and 5 may be executed in different order. For example, the system 300 may be configured such that the step of updating the dataset with the updates is only performed after it has been ascertained that the risk of re-identification is below the predetermined threshold. In some embodiments, the system 300 may be configured such that if the risk of re-identification is close to reaching or exceeding the predetermined dataset risk threshold, an alert is provided in the graphical user interface.

Figure 4:
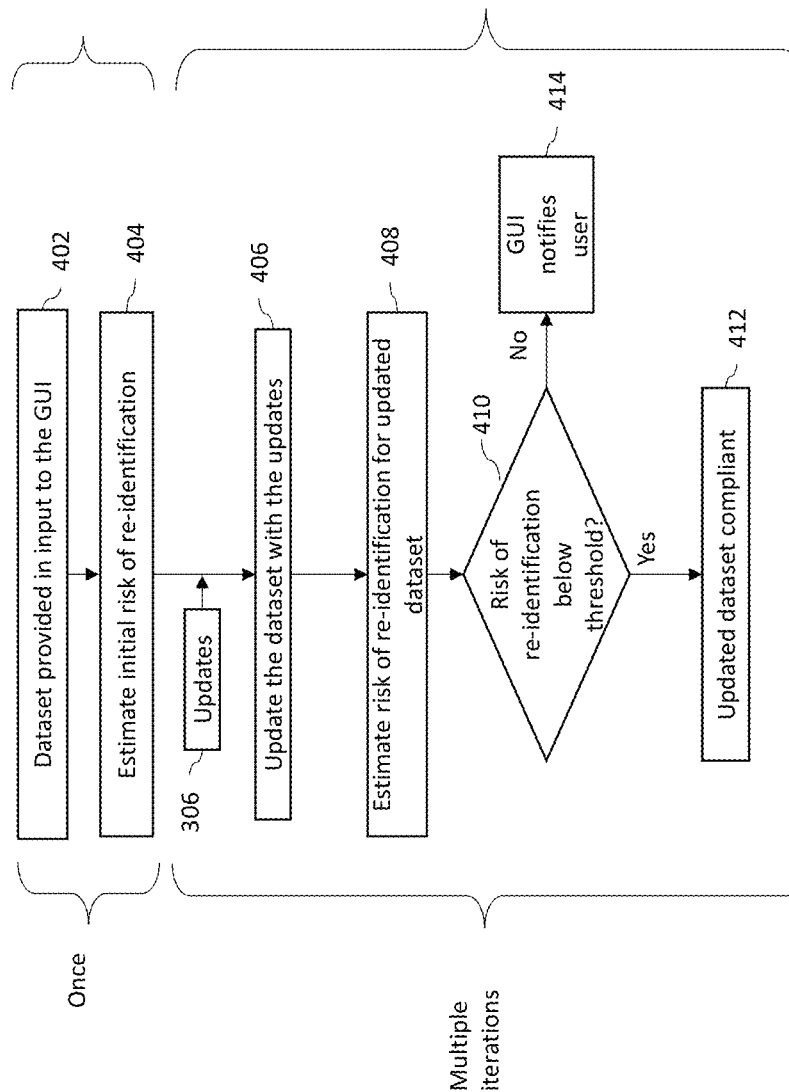
FIG. 4 is a schematic diagram illustrating an example use case of the system of FIG. 3, in accordance with a first embodiment of the method of FIG. 1.

In the specific examples of FIGS. 4 and 5 the risk of re-identification is to monitored whenever an update 306 is provided; however in some embodiments, the system may be configured such that the risk of re-identification of the updated dataset stored in the memory 308 is estimated at scheduled time intervals, such as at predetermined time intervals, or after a predetermined number of updates. For example, a user may need to ingest large amount of new records in the dataset 302 each day or week and the system 300 may be configured to monitor the risk of re-identification of the dataset 302 on a daily or weekly basis. Alternatively the system 300 may be configured to monitor the risk every 1000, 10,000, 100,000, . . . new records added to the dataset 302.

Settings such as the predetermined dataset risk threshold, when notifications/alerts should be provided, how often the risk should be monitored may all be agreed between a database owner and a risk determination expert and set up via the GUI prior to providing the dataset 302.

The risk of re-identification may be estimated in various ways. In some embodiments, the method 100 may comprise providing in input to the GUI one or more different risk estimation models such that a user can select one or more of the available models and the risk of re-identification for a dataset is estimated according to all the selected models. The GUI may be configured so show the outcome of the risk estimation for each selected model or the GUI may be configured such that the user can only select one model at a time and the outcome of the risk estimation is updated in real-time whenever the user selects a different model.

In preferred embodiments, the estimation of the risk of re-identification is fully or semi-automated. Estimating the risk of re-identification may comprise, for each source database, providing a list of risk-determination rules; and automatically computing the risk of—reidentification of the database based on the list of risk-determination rules.

Typically, the list of risk-determination rules will be set up in the GUI 304 by a risk determination expert upon reviewing the database 200 or the first de-identified dataset 302 sourced by the database 200 which the user provides in input to the system 300 and which then acts as a "standard" dataset for subsequent uploads. A user may then provide as input to the GUI 304 updates to the dataset 302, such as new sets of records to be ingested in the datasets, or the user may provide whole new datasets, wherein each new set of records to be added or each whole new dataset is de-identified from the source database according to the same de-identification process as the "standard" dataset 302. Then the risk of de-identification for said updates and/or the whole new dataset can be automatically estimated by the risk estimation module 314 according to the list of risk-determination rules set up by the risk determination expert.

The method 100 may comprise, when a user uploads the "standard" de-identified dataset, prompting the user with a series of questions about the dataset fields and the dataset in general, such as what type of variable each fields is expected to comprise, what fields the user wants to prioritize, what individual attributed does each field represent, what countries the dataset will be stored in, and so on. The information gathered during this step is then used by the risk determination expert to set up the list of risk determination rules in the GUI. Typically, a new list of risk determination rules will be set up for each new project that a user creates according to the privacy regulation that the project needs to comply with.

In some embodiments, the system 300 comprises a subset delivery checker module configured to: receive in input a set of risk determination rules and of compliance rules by a risk determination expert; each time a user extracts a new de-identified subset of records from the source database, automatically determine the risk of re-identification of the extracted dataset; compare the risk of re-identification of the extracted to dataset with the pre-determined risk threshold; and, provide in output a status of compliance or non-compliance based on the rules. The rules typically take into account the privacy regulations and any further regulation that the specific user and dataset need to comply with, the user needs and/or the source database characteristics. For example, a user may need to regularly extract datasets from their data warehouse (source database). By using the methods and systems according to the present disclosure, only one initial assessment would require the assistance of a risk-determination expert who sets up the list of risk-determination and compliance rules. Thereafter, the user would be able to assess all subsequently extracted datasets via the system 300 which automatically computes the risk of the dataset based on the rules set up by the expert for that specific source database from which the dataset was extracted. The system 300 may also be configured to provide a report via email, text or other communication medium. The report may contain information related to the compliance or non-compliance of the dataset, metrics about the number of entries in the dataset for which the individual risk or re-identification is below/above a specific value, information on the fields identified in the dataset and so forth.

Figure 6:
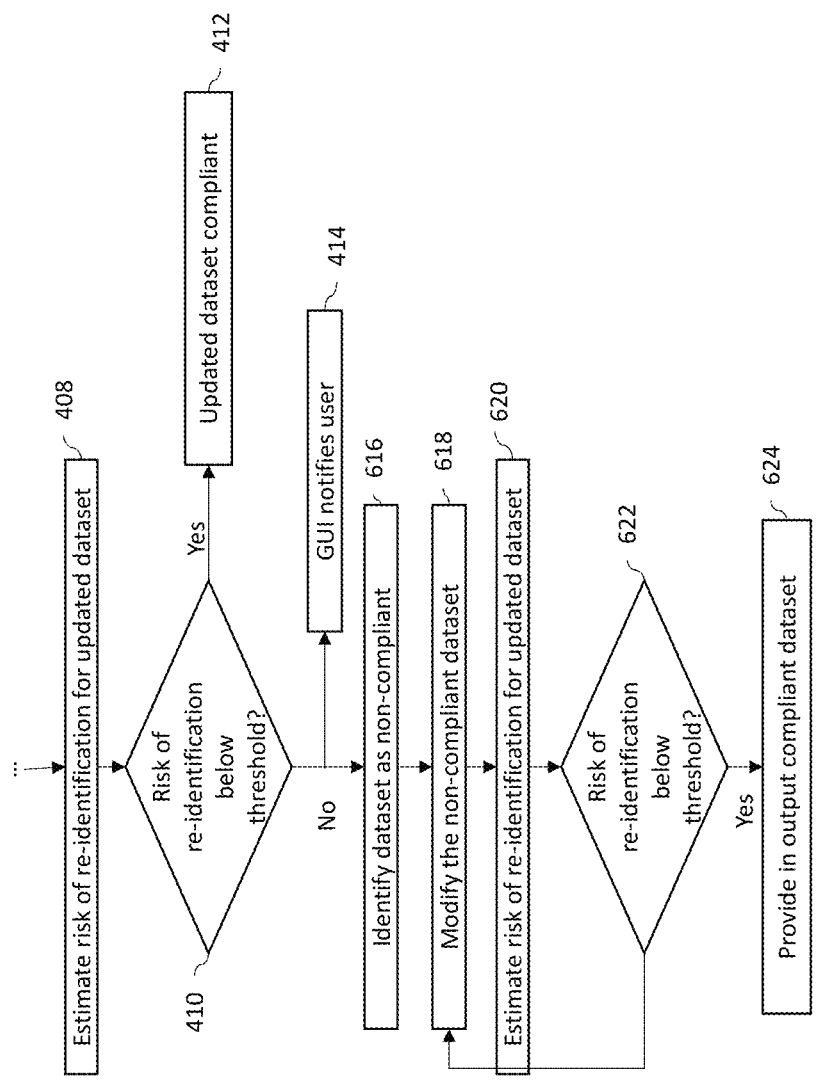
FIG. 6 is a schematic diagram of a method for providing in output a compliant dataset and for use in some of the embodiments according to the present disclosure.

The method 100 may comprise further steps for modifying a dataset which is found to be non-compliant and providing in output a compliant dataset, as illustrated in FIG. 6.

FIG. 6 is a schematic diagram of a method 600 for providing as output a compliant dataset and for use in some of the embodiments according to the present disclosure. The method 600 may be implemented as part of the method 400 or 500 of FIGS. 4 and 5. Common reference numerals and variables between figures represent common features.

At step 408 the risk of re-identification for the updated dataset is estimated and, if the risk is not below the pre-determined dataset risk threshold 312 (step 410), the user is notified (step 414) and the dataset is identified as non-compliant (step 616). At step 618 the non-compliant dataset is modified in order to generate a compliant dataset. At step 620, the risk of re-identification for the modified dataset is estimated: if it is below the pre-determined dataset risk threshold 312 (step 622), the dataset is identified as compliant and provided in output to the user via the GUI 304 step 624); otherwise, step 620 and 622 are repeated. The non-compliant dataset is iteratively modified until a compliant dataset is obtained.

The method 600 may further comprise providing as input to the graphical user interface a set of modification rules for modifying non-compliant datasets and generating compliant dataset. Said modification rules may be based on the source database and may be devised by a risk determination expert. One or more of the modification rules may be the same as the rules in the list of risk determination rules described above. In some embodiments the GUI 304 may comprise graphical elements to allow a user to input one or more user field priority settings and/or other user priority settings and the modification rules take into account said settings.

Modifications for transforming the non-compliant dataset into a compliant dataset may comprise for example removing one or more records for which the individual risk of re-identification is above the pre-determined individual risk threshold 318; or, identifying fields in the non-compliant dataset which are contributing to the risk of re-identification and removing or modifying one or more of said fields.

The method 600 may further comprise prompting the user in the database owner view of the GUI to accept or reject the compliant dataset provided at step 624 and, if the user rejects the dataset, provide a notification in the risk determination expert view of the GUI, such that the database owner and the expert can then engage with each other to generate a suitable compliant dataset.

The GUI 304 may comprise various graphical elements to input one or more user field priority settings and/or other user priority settings. Moreover, the GUI 304 may comprise graphical elements for providing updates to the dataset 302. In particular, in some embodiments, the GUI comprises sliders and/or other type of graphical elements for modifying one or more dataset characteristics and the GUI 304 is configured to show the evolution of the risk of re-identification for the dataset in real-time. For example, the GUI 304 may comprise sliders for varying the granularity of one or more dataset fields or for modifying the number of records including in the dataset, and so on.

The GUI 304 may further comprise graphical notification elements for notifying a user of various events. For example, the GUI may be configured to notify a user whenever the parsing module of the de-identified dataset generation module 316 detects that a high number of records have an incorrect field type and the dataset needs to be reviewed; or the GUI may notify a user when a risk estimation is completed and so on.

The dataset risk threshold 312 may be a value provided as input to the GUI 304 by a user, such as a risk determination expert, and stored in the memory 308; or it may be a value automatically determined by the system 300 based on user selected parameters, such as based on a specific risk estimation model selected by the user. The system may also be configured such that the user can input a pre-determined threshold range, that is the user may input not just a maximum acceptable risk abut also a minimum acceptable risk. Having a minimum risk may be useful to balance the need to secure the privacy of individuals vs the need of having access to data for research. The system 300 may notify the user when the risk has fallen below a pre-determined threshold, in which the case the database owner and/or the risk determination expert may review the de-identification process to identify whether useful information has been removed unnecessarily.

Figure 7:
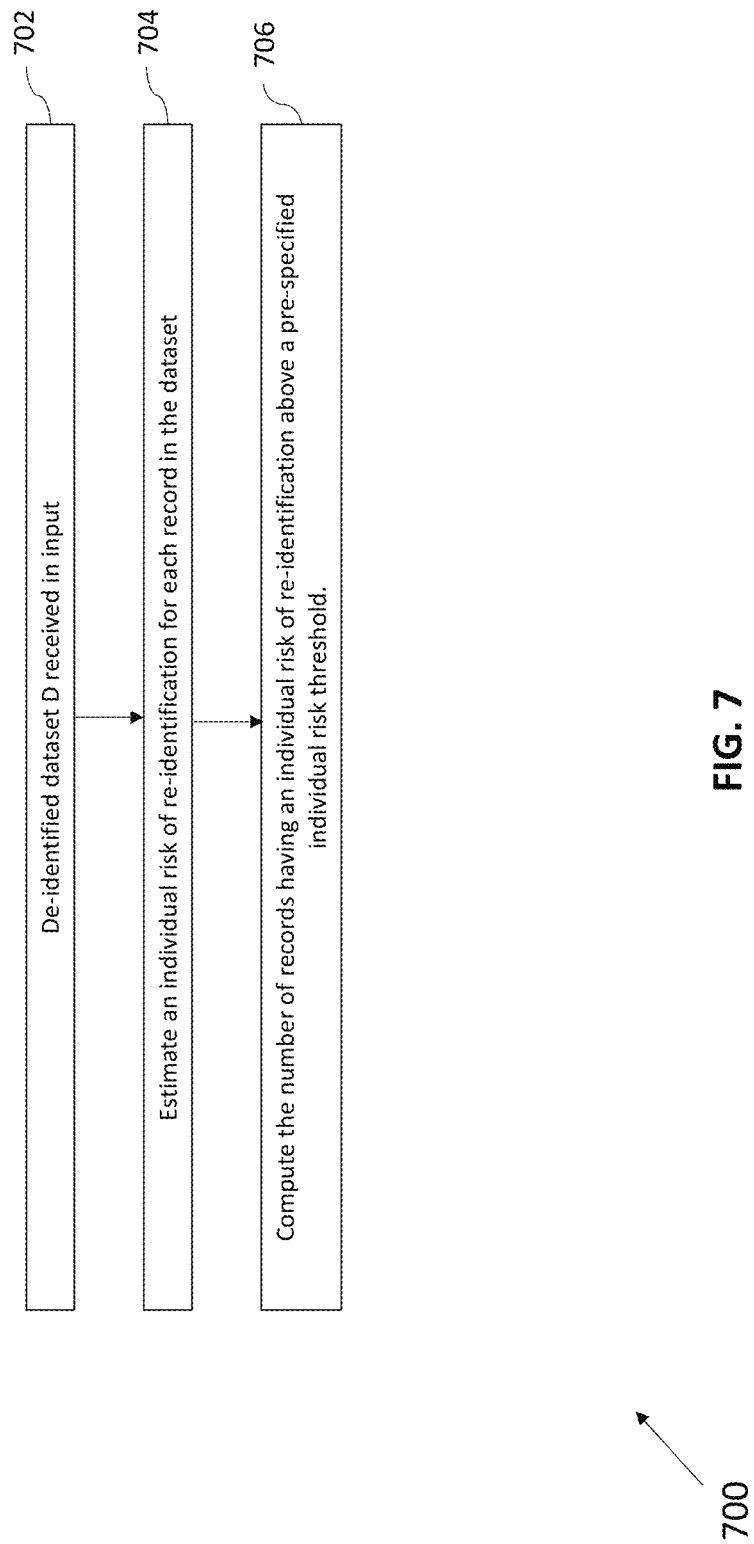
FIG. 7 is a schematic diagram of a method for estimating a risk of re-identification for a dataset and for use in some of the embodiments according to the present disclosure.

FIG. 7 is a schematic diagram of a method 700 for estimating a risk of re-identification for a dataset and for use in some of the embodiments according to the present disclosure. The method 700 may be used in conjunction with any of the methods and systems described above for estimating the risk of re-identification. For example, the method 700 may be implemented by the risk estimation module 314 as part of step 106 and 110 of the method 100.

At step 702 a de-identified dataset D is provided. The de-identified dataset D may be for example any of the de-identified dataset 302 provided in input to the GUI, or a set of records provided in the update 306; or the updated dataset and so on. At step 704 an individual risk of re-identification for each record $R_i$ in the dataset D is estimated. At step 706, the number of records having an individual risk of re-identification above a pre-specified individual risk threshold is determined.

For a given dataset D containing a N records $R_i$, the individual risk of re-identification for the record $R_i$ may be determined as follows. First of all, a subset of dataset fields $F_j$ which are deemed to be quasi-identifiers is selected and for each field $F_j$, a population field statistical distribution is computed. The population field statistical distribution for $F_j$ may be computing by selecting the source database or a second database external to the source database which relates to the source population; and deriving the population field statistical distribution from said selected database. For example, if the dataset D comprises information about individuals of the US population and the field $F_j$ is "age", then the population field's statistical distribution is given by the statistical distribution of the ages of the whole US population.

From the population field statistical distribution of the fields $F_j$, a combined statistical distribution is then computed and from said combined statistical distribution, the likely number $P_i$ of members of the source population that have the same field value as the record $R_i$ for each field in the subset of quasi-identifier fields is computed. For example, in some embodiments the risk estimation module 314 is configured to compute the likely number of members in the source population who have the same quasi-identifier values as the record $R_i$. The risk of re-identification of the dataset D can then be estimated from the number of records which have been associated with a number of population individuals below a pre-determined threshold. In typical applications, a dataset is deemed to be "safe" or compliant if the said number of records is less than 1% of the total number of records in the dataset.

It will also be appreciated that the individual risk of re-identification for the record $R_i$ in the dataset D may be determined according to different methods.

The method 700 is based on the assumption that in order for a record $R_i$ to be re-identified, a hypothetical attacker would have to be able to distinguish the individual associated to $R_i$ not from within the dataset D alone but from any other individual of the source population from which the records $R_i$ were sourced (e.g. the US population) and who has the same fields values as $R_i$. Therefore, a record which has unique fields values in the dataset D, would not necessarily be at risk of re-identification.

The population field statistical distribution of a given field $F_j$ may be derived by publicly available databases, such as Census databases. For quasi-identifiers for which comprehensive information about the source population is not publicly available or for which the information is not available with the granularity required, the population field statistical distribution may be derived "empirically" by looking at the distribution of field values in an external database known to the risk determination expert or in the database under examination itself. The population field statistical distribution may be computed for each database records in the database 200 when the first de-identified dataset 302 sourced by the database 200 is provided to the GUI 304 and thereafter stored in a library in the memory 308 such that they can be easily retrieved from the memory for subsequent risk estimations for datasets which are de-identified from the same database 200.

The statistical distributions stored in the library may be regularly updated to take account of changes in the US population, though minor changes are generally assumed to have negligible impact on the estimation of the risk of re-identification.

In some embodiments, the risk estimation module may further be configured to estimate an overall risk of re-identification from the individual risk of re-identification for each record by computing a mean and standard deviation of the individual risk of re-identification for all dataset records.

The system 300 may be configured to provide as output a metric representing the absolute or proportional number of identifiable and non-identifiable records in the dataset. For example, the system 300 may be configured to rank the individual risk of re-identification for each record from the highest to the lowest and/or to provide a total number of records for which the individual risk is above the predetermined individual risk threshold, and therefore the record is deemed identifiable, and a total number of records for which the risk is below the pre-determined individual risk threshold, and therefore the record is deemed non-identifiable.

Figure 8:
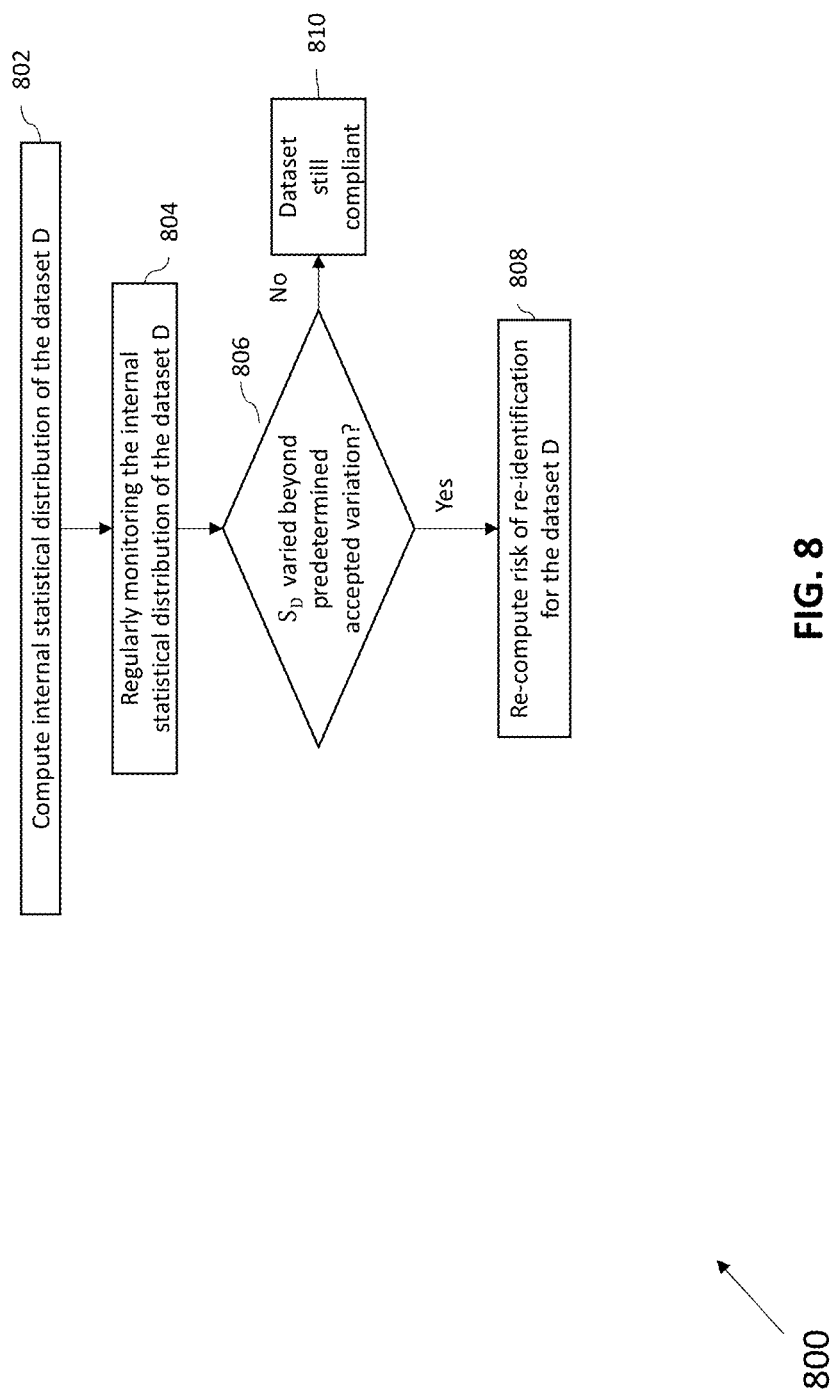
FIG. 8 is a schematic diagram of a method for monitoring the risk of re-identification of a dataset D, in accordance with a third embodiment of the method of FIG. 1.

FIG. 8 is a schematic diagram of a method 800 for monitoring the risk of re-identification of a dataset D, in accordance with a third embodiment of the method 100.

The method 800 may be used in conjunction with any of the methods and systems according to the present disclosure. For example, the method 800 may be implemented by the risk monitoring module 310 of FIG. 3.

The method 800 comprises: at step 802, computing an internal statistical distribution $S_D$ of the dataset D; at step 804, regularly monitoring the internal statistical distribution of the dataset D; if the internal statistical distribution of the dataset has varied beyond a predetermined accepted variation (step 806), re-computing the risk of re-identification for the dataset (step 808); otherwise the dataset D is identified as still compliant (step 810). Step 808 may also comprise alerting the user that a new risk estimation is needed because the internal statistical distribution of the dataset has drifted away from the initial internal statistical distribution computed at step 802 by more than the accepted variation.

Regularly monitoring the internal statistical distribution of the dataset at step 804 may comprise monitoring the internal statistical distribution of the dataset at scheduled time intervals or every time an update is provided or after a specific number of updates is provided, similarly to what explained previously.

In some embodiments one or more updates 306 comprising a set of database records to be added to the dataset stored in the memory 308 are provided; and monitoring the risk of re-identification comprises computing an internal statistical distribution $S_U$ of the update and checking whether the internal statistical distribution $S_{D+U}$ of the updated dataset differs from the initial internal statistical distribution $S_D$ of the dataset D by more than the predetermined accepted variation.

In other embodiments, monitoring the risk of re-identification comprises computing an internal statistical distribution $S_U$ of the update and checking whether the internal statistical distribution of the update $S_U$ differs from the initial internal statistical distribution $S_D$ of the dataset stored in the memory by more than the predetermined accepted variation.

Figure 9:
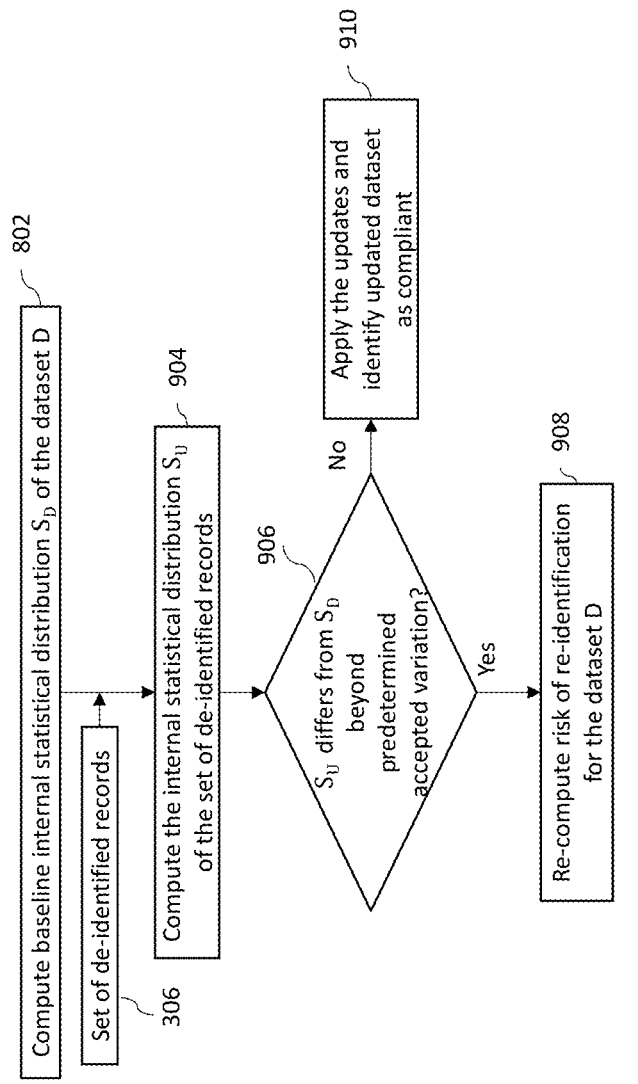
FIG. 9 is a schematic diagram of a method for monitoring the risk of re-identification of a dataset D, in accordance with a fourth embodiment of the method of FIG. 1.

This is shown in FIG. 9, which is a schematic diagram of a method 900 for monitoring the risk of re-identification of a dataset D, in accordance with a fourth embodiment of the method 100. Common reference numerals and variables between figures represent common features.

The method 900 comprises; each time a new set of de-identified records to be added to the dataset (update 306) is provided, computing the internal statistical distribution $S_U$ of the set of de-identified records provided in the update 306 (step 904); if the internal statistical distribution $S_U$ of the set of database records differs from the internal statistical distribution of the dataset $S_D$ beyond the predetermined accepted variation (step 906), re-computing the risk of re-identification for the updated dataset (step 908); otherwise applying the updates and identifying the updated dataset as compliant (step 910).

Computing the internal statistical distribution of a dataset or update typically comprises computing an internal field statistical distribution for each field individually and then combining the internal field statistical distribution to derive the internal statistical distribution of the dataset. In some embodiments, only the fields which are deemed to be quasi-identifiers are considered when computing the internal statistical distribution of the dataset or update in the method 800 and 900. In some embodiments the method may comprise looking at the internal field statistical distribution of each field individually and monitoring each field independently. In the present embodiments, the method may comprise providing different predetermined accepted variations for each field and regularly monitoring whether each internal field statistical distribution has varied beyond the predetermined accepted variation corresponding to the field under examination.

It will be appreciated that the methods and system according to the present disclosure may be implemented by any suitable combination of hardware and software components and are not limited to the specific examples provided herein. For example, the memory 308 may correspond to one or more memory components which comprise one or more of a hard-drive, a cloud-based storage, a server, and so on.

The systems and methods according to the present disclosure may be configured to integrate with one or more online document repositories and/or integrate with or be implement via online cloud services, such as Amazon Web Services (AWS). They may further be configured to be used in conjunction with online project management tools (e.g. Monday.com) to facilitate project management by the users.

It will be appreciated that in different embodiments the steps of the above methods may be executed in different order and that the stated steps do not preclude the presence or addition of one or more other steps.

It will also be appreciated that the components and method steps described above with reference to specific embodiments may be interchangeable and that many other embodiments may be obtained by combining individual components and methods steps in different ways without departing from the scope of the present disclosure.

The methods and system according to the present disclosure allow a dataset to be monitored over time and take into account changes in the source population, new data ingested in the dataset, and more generally any update to the dataset which causes a variation in the risk. This provides many advantages.

By automatically detecting and notifying a user when a dataset is not compliant any more the number of interactions between database owners and risk determination expert can be significantly reduced, thereby enabling better scalability and workflows. Moreover, the system and methods according to the present disclosure allow a user to automatically avoid non-compliance scenarios by generating a compliant dataset. The risk of a database owner breaching privacy rules and the cost and time of de-identifying datasets are minimized. Most of the onus on database owners is removed, since they can rest assured that their datasets are compliant unless the GUI notifies them to the contrary. Certificates and reports can be retrieved at any time, streamlining significantly the tasks required by assessors, experts and database owners.

Looking at the individual risk of re-identification for each dataset allows a user to perform a risk assessment even for dataset wherein the information for one or more records is incomplete or missing.

The de-identification process can be adjusted to meet each user's needs such that an optimal balance between a low risk of re-identification and preserving essential information for the user is achieved. The monitoring and risk estimation can be fully configured via the GUI to suit each database owner's needs.

By providing an automatically generated ranking of the records with the higher risk of re-identification, a user can easily identify which records are contributing more to the risk and then adjust the dataset accordingly, without having to sacrifice an entire dataset field. The methods and system according to the present disclosure further allow risk determination experts to "slice and dice" the data in a dataset in any way, such that the risk of re-identification can be minimized whilst sacrificing as little useful information as possible.

Furthermore, since the methods and system proposed in the present disclosure comprise computing a risk for the individual records, they can further benefit from the possibility of implementing parallel computing architectures.

By providing a real-time visualization of the risk for a dataset as well as of other dataset attributes, the system and methods of the present disclosure provide useful insights on past and present dataset which can be used to improve subsequent updates and risk estimations.

If users need to provide multiple certificates which are based on different templates and/or which certify compliance with different regulations, which may also involve using different risk estimation models, for the same database, they can do so automatically and immediately from within the application.

What is claimed is:

1. A computer implemented method for monitoring a risk of re-identification for a dataset de-identified from a source database containing information identifiable to individuals, the method comprising:
    providing a user interface (UI) configured to receive as input the dataset and updates to said dataset;
    providing as input to the UI the dataset;
    providing a computer device configured by a first computer program to estimate a risk of re-identification for the dataset or a subset of the database by automatically estimating an individual risk of re-identification for each record and determining how many records have an individual risk of re-identification above a pre-specified individual risk threshold;
    providing as input to the UI the updates to said dataset;
    wherein said computer device is further configured by a second computer program to regularly monitor whether the risk of re-identification for at least one of the updated dataset or the subset of the database or the updates is below a predetermined dataset risk threshold, and if the risk of re-identification has reached or exceeded the predetermined dataset risk threshold, to automatically estimate an individual risk of re-identification that comprises:
    selecting a subset of fields, for each field in the subset computing a population field statistical distribution;
    computing a combined statistical distribution of the subset of fields from the population field statistical distributions; and
    computing the likely number of members of the source population that have the same field value as the record for each field in the subset of fields, from the combined statistical distribution, and
    if the risk of re-identification has reached or exceeded the predetermined dataset risk threshold, identifying the dataset as non-compliant;
    iteratively modifying the non-compliant dataset until the risk of the re-identification for the modified dataset is below the predetermined dataset risk threshold in order to generate a compliant dataset and providing the compliant dataset in the user interface.

2. The method of claim 1, wherein
    the database comprises a plurality of database records and a plurality of database fields, wherein each database record has a plurality of associated field values, each associated field value being related to a database field;
    the dataset comprises a plurality of dataset records and a plurality of dataset fields, wherein each dataset record has a plurality of associated field values, each associated field value being related to a dataset field; and
    the plurality of dataset records is a subset of the database records and the plurality of dataset fields is a subset of the database fields.

3. The method of claim 2, wherein each database record corresponds to an individual of a source population.

4. The method of claim 1, wherein the fields in the subset of fields are selected such that all fields in the subset of fields are quasi-identifiers.

5. The method of claim 1, wherein computing the population field statistical distribution comprises:
    selecting the source database or a second database external to the source database which relates to the source population; and
    deriving the population field statistical distribution from the selected database.

6. The method of claim 1, wherein the method further comprises computing an internal statistical distribution of the dataset; and regularly monitoring whether the risk of re-identification for at least one of the updated dataset or the updates is below the predetermined dataset risk threshold comprises:
    regularly monitoring the internal statistical distribution of the dataset; and
    if the internal statistical distribution varies beyond a predetermined accepted variation, re-computing the risk of re-identification for the dataset.

7. The method of claim 1, wherein providing updates to the initial dataset comprises providing a set of de-identified records to be added to the dataset.

8. The method of claim 7, wherein regularly monitoring whether the risk of re-identification for at least one of the updated dataset or the updates is below a predetermined dataset risk threshold comprises
    computing the risk of re-identification for the set of database records; and
    if the risk of re-identification for the set of database records is greater than the risk of re-identification for the dataset, re-computing the risk of re-identification for the updated dataset.

9. The method of claim 7, wherein regularly monitoring whether the risk of re-identification for at least one of the updated dataset or the updates is below a predetermined dataset risk threshold comprises:
    each time a set of database records is added to the dataset, computing an internal statistical distribution of the set of database records;
    if the internal statistical distribution of the set of database records differs from the internal statistical distribution of the dataset beyond the predetermined accepted variation, re-computing the risk of re-identification for the updated dataset.

10. The method of claim 1, wherein estimating the risk of re-identification comprises:
    for each source database, providing a list of risk-determination rules; and automatically computing the risk of-reidentification of the database based on the list of risk-determination rules.

11. The method of claim 1, wherein the method further comprises providing as input to the user interface a set of modification rules based on the source database; and the non-compliant dataset is modified according to the modification rules.

12. The method of claim 11, wherein generating a compliant dataset comprises identifying fields in the dataset which are contributing to the risk of re-identification and removing or modifying one or more of said fields.

13. The method of claim 1, wherein regularly monitoring whether the risk of re-identification for at least one of the updated dataset or the updates is below a predetermined threshold comprises estimating the risk of re-identification for the updated dataset at scheduled intervals.

14. The method of claim 1, wherein the method further comprises providing in the GUI an automatically generated outcome report of the monitoring of the risk of re-identification.

15. A system for monitoring a risk of re-identification for a dataset de-identified from a source database containing information identifiable to individuals, the system comprising:
  a user interface (GUI) configured to receive as input the dataset and updates to said dataset;
  a memory configured to store the dataset; and
  a risk monitoring computer device configured to regularly monitor whether the risk of re-identification for at least one of the updated dataset or a subset of the database or the updates is below a predetermined dataset risk threshold, by automatically estimating an individual risk of re-identification for each record and determining how many records have an individual risk of re-identification above a pre-specified individual risk threshold;
  wherein the system is configured so that if the risk of re-identification has reached or exceeded the predetermined dataset risk threshold, automatically notify the user;

wherein, if the risk of re-identification has reached or exceeded the predetermined dataset risk threshold, the user is automatically notified;

wherein estimating the individual risk or re-identification for each record comprises:
selecting a subset of fields, for each field in the subset computing a population field statistical distribution;
computing a combined statistical distribution of the subset of fields from the population field statistical distributions; and
computing the likely number of members of the source population that have the same field value as the record for each field in the subset of fields, from the combined statistical distribution; and
if the risk of re-identification has reached or exceeded the predetermined dataset risk threshold, identifying the dataset as non-compliant;
iteratively modifying the non-compliant dataset until the risk of the re-identification for the modified dataset is below the predetermined dataset risk threshold in order to generate a compliant dataset and providing the compliant dataset in the user interface.

16. The system of claim 15, wherein
the user interface comprise a graphical user interface (GUI);
the updates to the database comprise one or more of: removing one or more records from the dataset records; adding one or more records to the dataset records;
and removing, adding or modifying one or more dataset fields; and
the graphical user interface comprises graphical elements to allow the user to modify one or more dataset fields; and the graphical user interface is configured to show the evolution of the risk of re-identification for the dataset in real-time.

* * * * *